July 4, 1939.  L. F. MULNO  2,164,467

LAWN MOWER ATTACHMENT

Filed Oct. 24, 1936  2 Sheets-Sheet 1

INVENTOR.
Lester F. Mulno
BY
Gardner W. Pearson
ATTORNEY.

July 4, 1939.  L. F. MULNO  2,164,467
LAWN MOWER ATTACHMENT
Filed Oct. 24, 1936  2 Sheets-Sheet 2
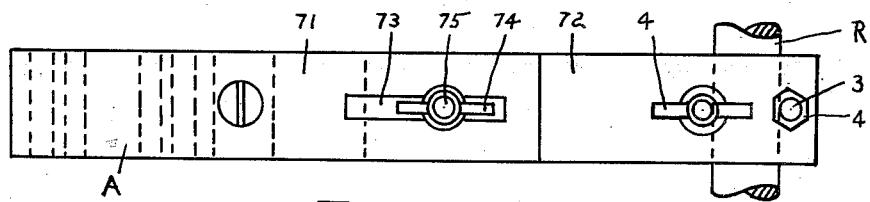
Fig. 5.
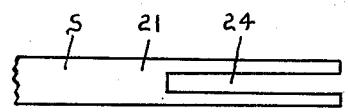
Fig. 6.
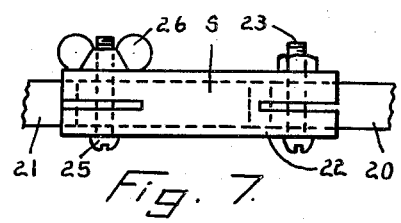
Fig. 7.
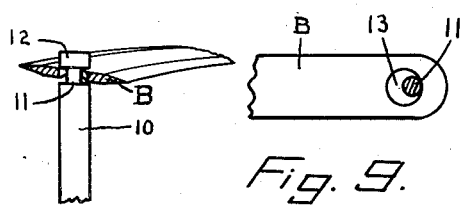
Fig. 9.
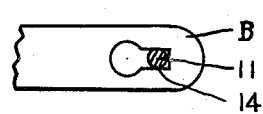
Fig. 10.
Fig. 8.
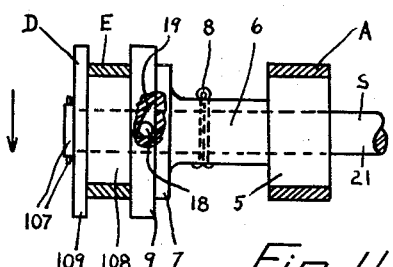
Fig. 11.
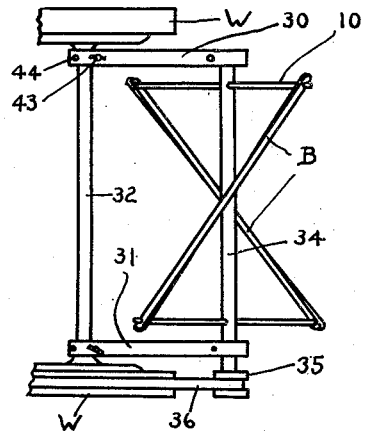
Fig. 12.
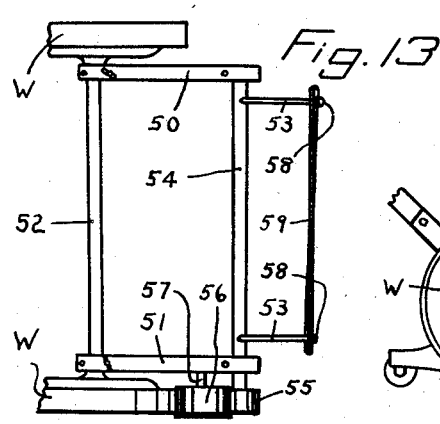
Fig. 13
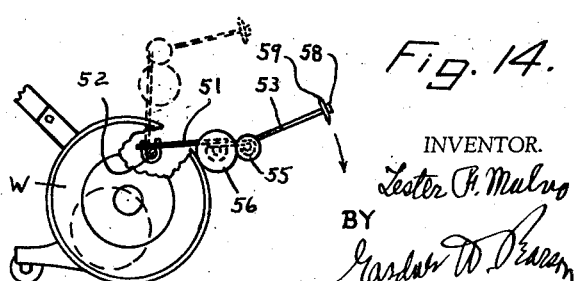
Fig. 14.
INVENTOR.
Lester F. Mulno
BY
Gardner W. Pearson
ATTORNEY.

Patented July 4, 1939

2,164,467

UNITED STATES PATENT OFFICE 2,164,467

LAWN MOWER ATTACHMENT

Lester F. Mulno, Lowell, Mass.

Application October 24, 1936, Serial No. 107,323

5 Claims. (Cl. 56—238)

This invention relates to lawn mowers. It can be in the form of an attachment to any of the ordinary types of lawn mowers which have supporting wheels with flat rims together with a revolving cutter and fixed knife, or it can be a permanent part of such a lawn mower.

The object is to provide a secondary set of cutting blades, without a cooperating knife, which are so set that they will cut the high parts of the grass or other growths so that the regular revolving cutter and knife can cut the rest, thus avoiding going over the grass plot twice as is now necessary with some devices.

The secondary cutting blades are so arranged that they will revolve at a high rate of speed and will strike the tall stalks at such an angle that they will shear them without the necessity of any stationary knife.

My secondary cutting blade or blades need not be as long as the width of the blades of the primary cutter because in using lawn mowers, each adjoining track overlaps the first. While I prefer to use two blades each set at such an angle that they will make a shearing cut, I can use one blade which extends substantially parallel with its revolving shaft as I depend upon high speed and a thin sharp blade to do the cutting.

I find it necessary to have a drive belt or other friction device on one side only as a small amount of slipping is not objectionable, and while I prefer to use a lawn mower with a stay bar which is in position in a direction at substantially 45 degrees up and in front of the axis of the wheels as this permits the secondary cutting devices to be swung up out of the way without stretching the belt, I can use a friction pulley instead of the belt and can attach the devices to a stay bar in any forward position.

In the drawings, Fig. 1 is a side elevation, Fig. 2 a diagrammatic plan view and Fig. 3, a diagrammatic front view of a lawn mower equipped with my device, the parts being broken away to show the construction.

Fig. 5 is a plan view of one of such arms.

Figs. 6 and 7 are views showing details of the adjustable drive shaft.

Figs. 8 and 9 and 10 are detail views showing the construction of the spokes and blades.

Fig. 11 is an elevation, partly in section, of one of the supports and bearings for the drive pulley.

Figs. 12 and 13 are diagrammatic plan views of different modifications, and

Fig. 14 is a diagrammatic side elevation of the modification shown in Fig. 13.

Figure 1:
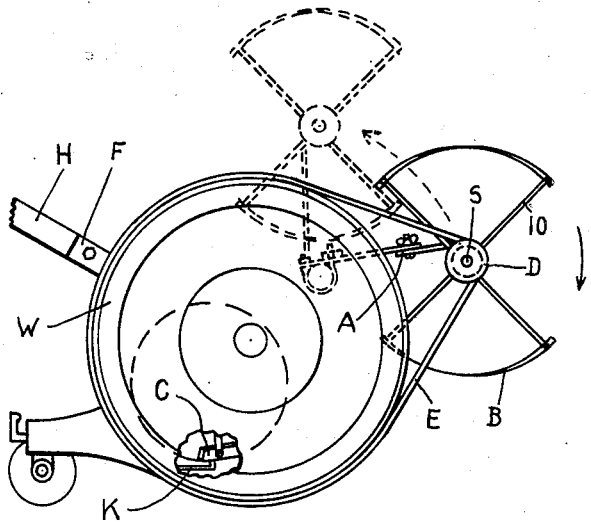

In the drawings, H represents the handle of a lawn mower attached to a frame F to which is fixed the usual horizontal knife K and which also carries the revolving cutter C. The mechanism between the wheels W and the cutter C is old and well-known and is, therefore, not shown.

Plates 1 and 2 are carried by the frame F in the usual manner and are connected by the usual stay rod R. When my device is used as an attachment, I provide the arms A, A at one end of each of which are U-shaped clamps such as 3 and nuts 4 which embrace stay rod R, and when tightened, hold the arms A, A at any desired angle so that the bearings, such as 5, at their other ends for a drive shaft S which carries radial spokes such as 10, 10 and which carry cutting blades B, B, can be raised or lowered so as to cut at any desired height.

As shown, each arm A is formed of two parts 71 and 72 and by means of a slot 73, wing nut 74 and bolt 75, can be made longer or shorter.

Part of this shaft S projects outside of one of the arms A and carries a small drive pulley D around which and around one of the wheels W, which is in alignment with it, passes a flat endless belt E.

It is obvious that as the wheels W, W revolve, belt E revolves pulley D and therefore shaft S carrying the blades B, B at the desired height.

Figure 3:
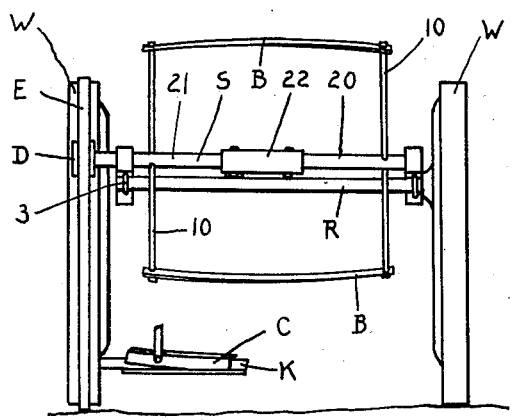

In the preferred construction, each spoke 10 has at the end a neck 11 and a head 12 and each blade, such as B, has a round hole 13 which just fits over a head 12, as shown in Fig. 9. Each blade B is preferably made with a slight bend or bow, as shown in Fig. 3 and Fig. 8, and as the spokes 10, 10 are in different radial planes, after slipping the hole 13 in at one end over a head 12 and down to the neck 11, in order to slip the hole at the other end over the head and neck of another spoke in a different radial plane, the blade must be pulled straight and twisted with the result that when released the ends are pulled towards each other so that, as shown in Figs. 8 and 9, the blade is held in position. When shaft S is revolved at a high speed, centrifugal force tends to throw the middle of each blade B out and to pull in the ends still more. Each blade B can, therefore, be quickly snapped in place or removed when an old blade becomes dull, breaks or when it is desirable to disassemble the outfit.

A keyhole such as 14 in Fig. 10 can be used if preferred. In either case, the spring and twist of the blade will keep it in place.

As shown, the spokes 10 are fixed, two on opposite sides of each section 20 and 21 of shaft S and these sections are preferably connected together by a sleeve 22 permanently fixed to 20 by a bolt 23, while there is a slot 24 through the part 21 and through this slot passes a bolt 25 with a wing nut 26. The length of this shaft S can, therefore, be varied to fit different widths of lawn mowers. When the length of this shaft is varied, new blades, such as B, of the necessary length must be used.

As in the use of a lawn mower by hand it is constantly being pulled back to avoid shrubbery and to go over the same place twice, and as my secondary cutter is intended to revolve at a very high rate of speed, I prefer to use a ratchet or clutch in connection with the small pulley D, as shown in detail in Fig. 11.

Figure 4:
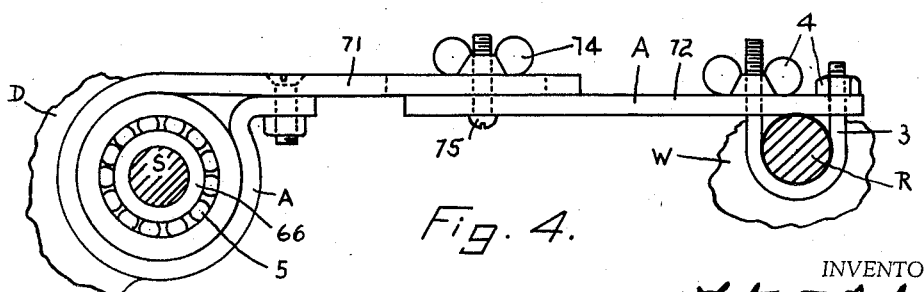
Fig. 4 is an enlarged vertical sectional elevation of one of the supporting arms on the line 4—4 of Fig. 2.

Pulley D has heads 109 and 9 on each side of a body 108 which is mounted on the part 21 of drive shaft S and is held in position by a pinned washer 107 and a head 7 carried by a sleeve 6 which, as shown, rests against the inside member 66 of a ball bearing, such as shown in Fig. 4, the sleeve 6 being fastened to shaft S as by a pin 8.

In the face of head 9 which rests against the head 7 is a tapering grooved slot 19 in which is a ball 18, the parts being so arranged that when pulley D is being driven in the direction of the arrow by belt E ball 18 will jam between head 7 and slot 19 and it will carry along with it shaft S and the cutting blades, but when the lawn mower is pulled back and the belt and pulley D are reversed ball 18 will move away from head 7 into the deep part of slot 19 and the shaft S of the secondary cutting blades will continue to revolve.

When the arms and blades are raised, the adjustment can be such that the belt is slack and it can be removed.

As shown in Fig. 12, instead of adjustable arms, such as A, A, and an adjustable drive shaft, such as S, one piece arms, such as 30 and 31, can be adjustably or permanently fixed to a stay rod 32 by means of U-shaped clamps, such as 43 and bolts 44 similar to 3 and 4 shown in Fig. 4, and the drive shaft, such as 34, can be in one piece instead of being adjustable. A pulley such as 35 for the belt 36 may be used without any ratchet construction, such as shown in Figs. 1, 2 and 11.

As shown in Figs. 13 and 14, one piece arms 50 and 51, which are similar to 30 and 31, can be used to attach the secondary cutters to a stay rod 52 and to carry a drive shaft such as 54 from which project two arms 53, 53 which carry a single blade 59, the drive shaft 54 being driven by means of a flat faced pulley 55. This pulley 55 is driven from a wheel W by means of an intermediate friction pulley 56 carried by a spindle 57 fastened to one of the arms 51.

The construction in this case is such that when the arms 50 and 51 are swung up on stay rod 52, this friction pulley 56 disengages itself from wheel W. Blade 59 is attached to arms 53, 53 by screws 58, 58. It is straight and may be single edged.

Figure 2:
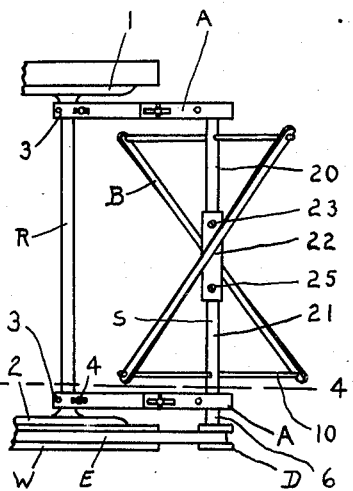

I prefer to use thin double edged blades, each of which connects two arms set in different radial planes, those shown in Figs. 1, 2, 3 and 10 being ninety degrees apart, as the blade must be twisted and bowed as shown in Figs. 1 and 3, and this keeps the holes in its ends in place on the necks of the arms as shown in Figs. 8, 9, 10. Twisting shortens each blade.

Centrifugal force also helps to hold the blades in place.

I prefer to have my arms and blade or blades adjustable in height for different lengths of grass and for convenience in disconnecting the belt or friction pulley.

I claim:

1. A rotary cutting attachment for lawn mowers having two wheels each with a flat rim and having a primary revolving cutting knife, a stationary cutting knife and a stay rod; said attachment including two arms each adjustable in length and each having a clamp at one end for attaching to the stay rod and a bearing at the other end for a secondary cutter drive shaft; a lengthwise adjustable secondary cutter drive shaft revoluble in the arm bearings and projecting through one bearing, such projection carrying a drive pulley with a flat rim and heads; a plurality of radial spokes carried by the drive shaft; and two thin, flexible cutting blades, each detachably attached near one end to the free end of a spoke.

2. A rotary cutting attachment for lawn mowers having two wheels each with a flat rim and having a primary revolving cutting knife, a stationary cutting knife and a stay rod; said attachment including two arms each having a clamp at one end for attaching to the stay rod and a bearing at the other end for a secondary cutter drive shaft; a secondary cutter drive shaft revoluble in the arm bearings and carrying a drive pulley with a flat rim and heads; a plurality of radial spokes carried at one end by and extending from the drive shaft in different radial planes, each having at its other end a neck and a head; and an elastic cutting blade having a hole at each end, of greater size than the head, through which the neck passes.

3. An attachment for lawn mowers including bearings and means for attaching said bearings for a secondary cutter drive shaft to the lawn mower; a secondary cutter drive shaft revoluble in the bearings; means for driving the shaft; a plurality of radial spokes carried at one end by and extending from the drive shaft in different radial planes, each having at its other end a neck and a head; and an elastic cutting blade having a hole at each end, of greater size than the head, through which the neck passes.

4. A rotary cutting attachment for lawn mowers having two wheels, each wheel having a rim and the lawn mower having a primary revolving cutting knife, a stationary cutting knife and a stay rod; said attachment including two arms, each having a clamp at one end for attaching to the stay rod and a bearing at the other end for a secondary cutter drive shaft; a secondary drive shaft revoluble in the arm bearings and carrying a drive pulley; a ratchet connecting the drive pulley and the cutter drive shaft; a plurality of radial spokes carried by the drive shaft; and a cutting blade attached near each end to the free end of a spoke.

5. A rotary cutting attachment for lawn mowers having two wheels, each wheel having a rim and the lawn mower having a primary revolving cutting knife and a stay rod; said attachment including two arms, each adjustable in length and each having a clamp at one end for attaching to the stay rod and a bearing at the other end for a secondary cutter drive shaft; a lengthwise adjustable secondary cutter drive shaft revoluble in the arm bearings and projecting through one bearing, such projection carrying a drive pulley; a plurality of radial spokes carried by the drive shaft and a plurality of cutting blades each attached near one end to a free end of a spoke.

LESTER F. MULNO.